(12) United States Patent
Takase et al.

(10) Patent No.: US 7,330,015 B2
(45) Date of Patent: Feb. 12, 2008

(54) POWER GENERATION CONTROLLER

(75) Inventors: Yasuhiro Takase, Kariya (JP);
Tadatoshi Asada, Anjo (JP); Koji Tanaka, Anjo (JP)

(73) Assignee: Denso Corporation, Kariya (JP)

( * ) Notice: Subject to any disclaimer, the term of this patent is extended or adjusted under 35 U.S.C. 154(b) by 15 days.

(21) Appl. No.: 11/373,123

(22) Filed: Mar. 13, 2006

(65) Prior Publication Data
US 2006/0232247 A1 Oct. 19, 2006

(30) Foreign Application Priority Data
Mar. 15, 2005 (JP) ............... 2005-072630

(51) Int. Cl.
*H02H 7/06* (2006.01)
*H02P 9/00* (2006.01)
*H02P 11/00* (2006.01)

(52) U.S. Cl. .......................... 322/28; 322/24
(58) Field of Classification Search ................. 322/24, 322/26, 28, 46
See application file for complete search history.

(56) References Cited

U.S. PATENT DOCUMENTS

| 3,942,096 | A | 3/1976 | Itoh et al. | |
| 5,243,270 | A * | 9/1993 | Mayumi et al. | ............... 322/28 |
| 6,734,653 | B2 * | 5/2004 | Taniguchi et al. | ............. 322/24 |
| 6,943,532 | B1 * | 9/2005 | Kouwa et al. | ................. 322/28 |
| 7,098,628 | B2 * | 8/2006 | Maehara et al. | ............... 322/24 |
| 2002/0043962 | A1 | 4/2002 | Taniguchi et al. | |
| 2002/0193922 | A1 * | 12/2002 | Taniguchi et al. | ............. 701/29 |
| 2004/0008008 | A1 * | 1/2004 | Uematsu et al. | ............... 322/28 |
| 2006/0091864 | A1 * | 5/2006 | Watanabe et al. | ............. 322/28 |
| 2006/0139012 | A1 * | 6/2006 | Iwatani et al. | ................ 322/28 |

FOREIGN PATENT DOCUMENTS

| EP | 0 430 208 A2 | 6/1991 |
| EP | 1 198 048 A2 | 4/2002 |
| JP | A-07-015886 | 1/1995 |

OTHER PUBLICATIONS

Sep. 12, 2006, European Patent Office Communication from European Patent Application No. 06005102.6.

* cited by examiner

*Primary Examiner*—Julio C. Gonzalez
(74) *Attorney, Agent, or Firm*—Oliff & Berridge, PLC

(57) ABSTRACT

The power generation controller, which is for regulating an output voltage of a vehicle generator or a battery voltage of a vehicle battery charged by the vehicle generator by controlling an excitation current flowing into an excitation winding of the vehicle generator, includes a switching element connected in series between an output terminal of the vehicle generator and the excitation winding, a voltage control circuit on/off controlling the switching element such that one of the output voltage of the vehicle generator and the battery voltage is kept at a target voltage, and a contact abnormality detector circuit detecting a voltage of the output terminal as the output voltage of the vehicle generator, and detecting abnormality in a contact state between the power generation controller and the output terminal on the basis of the detected output voltage of the vehicle generator.

8 Claims, 3 Drawing Sheets

POWER GENERATION CONTROLLER

CROSS-REFERENCE TO RELATED APPLICATION

This application is related to Japanese Patent Application No. 2005-72630 filed on Mar. 15, 2005, the contents of which are hereby incorporated by reference.

BACKGROUND OF THE INVENTION

1. Field of the Invention

The present invention relates to a power generation controller for controlling power generating operation of a vehicle generator mounted on a passenger car, a truck or the like.

2. Description of Related Art

An output terminal of a vehicle generator is connected to a terminal of a vehicle battery through a charge cable for charging the vehicle battery. If the charge cable breaks or comes off the output terminal of the vehicle generator, the vehicle battery is prevented from being charged, as a result of which not only various electric devices mounted on a vehicle are made unusable, but it also becomes difficult to run the vehicle, because engine control cannot be performed normally. Accordingly, it is known, as disclosed in Japanese Patent Application Laid-open No. 7-15886, to provide a power generation controller with a function of giving warning to a vehicle driver when the charge cable breaks or comes off the output terminal of the vehicle generator by lighting a warning lamp. The power generation controller disclosed in this patent application is configured to light the warning lamp when a voltage applied from the vehicle battery to the warning lamp through an ignition switch become lower than a predetermined voltage. Since the vehicle battery can supply electric power to an engine control unit etc., for a short time after the charge cable breaks or comes off the output terminal of the vehicle generator, the vehicle driver can reconnect the charge cable or replace the charge cable at a nearby service garage before the vehicle becomes unable to travel.

However, the power generation controller having such a function as disclosed in Japanese Patent Application Laid-open No. 7-15886 cannot cope with a case where the charge cable is perfectly connected to the output terminal of the vehicle generator, but the power generation controller is imperfectly connected to this output terminal of the vehicle generator. In this case, the warning lamp is not lit, since the voltage supplied to the warning lamp from the vehicle battery is not lowered. The imperfect connection between the output terminal of the vehicle generator and the power generation controller can cause overcharging of the vehicle battery, because the power generation controller commands the vehicle generator to raise the output voltage by a value depending on a drop of the voltage supplied to the power generation controller through the output terminal of the vehicle generator, which is caused by large contact resistance between the output terminal of the vehicle generator and the power generation controller.

It is possible to avoid the overcharging of the vehicle battery by regulating the output voltage of the vehicle generator at a certain target voltage. However, in this case, there arises another problem in that the vehicle battery is undercharged, because a voltage which the power generation controller applies to an excitation winding of the vehicle battery is reduced by an amount of the voltage drop caused by the large contact resistance between the output terminal of the vehicle generator and the power generation controller.

SUMMARY OF THE INVENTION

The present invention provides a power generation controller for regulating an output voltage of a vehicle generator or a battery, voltage of a vehicle battery charged by the vehicle generator by controlling an excitation current flowing into an excitation winding of the vehicle generator, the power generation controller comprising:

a switching element connected in series between an output terminal of the vehicle generator and the excitation winding;

a voltage control circuit on/off controlling the switching element such that one of the output voltage of the vehicle generator and the battery voltage is kept at a target voltage; and a contact abnormality detector circuit detecting a voltage of the output terminal as the output voltage of the vehicle generator, and detecting abnormality in a contact state between the power generation controller and the output terminal on the basis of the detected output voltage of the vehicle generator.

The power generation controller of the invention has a function of detecting abnormality in a contact state with the output terminal of a vehicle generator. Accordingly with the power generation controller of the invention, it becomes possible to reliably prevent a vehicle battery from being overcharged or undercharged when the output terminal of the vehicle generator and the power generation controller lose good contact with each other.

PREFERRED EMBODIMENTS OF THE INVENTION

Figure 1:
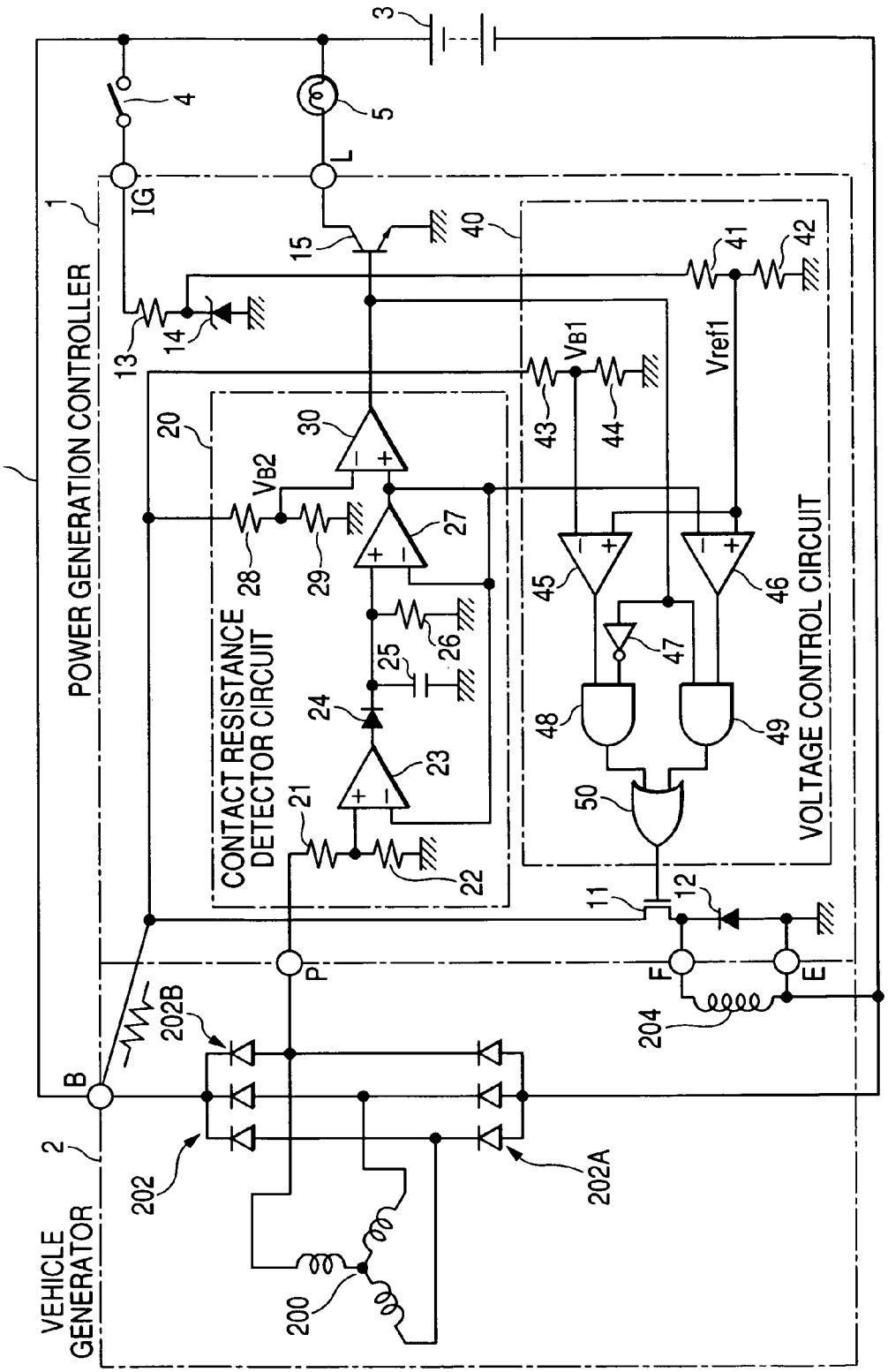
FIG. 1 is a diagram showing a structure of a power generation controller according to a first embodiment of the invention.

FIG. 1 is a diagram showing a structure of a power generation controller 1 according to a first embodiment of the invention, which controls power generating operation of a vehicle generator 2. In this figure, the reference numeral 3 denotes a vehicle battery, 4 denotes an ignition switch, and 5 denotes a warning lamp. The power generation controller 1 is configured to control an excitation current of the vehicle generator 2 such that the output voltage of the vehicle generator 2 is regulated at a predetermined target voltage (14V, for example), and to control the on/off state of warning lamp 5 in accordance with the operation state of the vehicle generator 2.

The vehicle generator 2 includes a three-phase stator winding 200, a three-phase full wave rectifier 202, and an excitation winding 204. The three-phase full wave rectifier 202 is constituted by a lower half-bridge 202A and a higher half-bridge 202B. The lower half-bridge 202A is constituted by three diodes connected to one ends of three phase coils of the stator winding 200 at their cathodes, respectively, and grounded at their anodes. The higher half-bridge 202B is constituted by three diodes connected to the one ends of the three phase coils of the stator winding 200 at their anodes, respectively, and connected to an output terminal (B terminal) of the vehicle generator 2 at their cathodes. One of the three connection points between the lower half-bridge 202A and the higher half-bridge 202B, which is connected to one of the one ends of the three phase coils, is connected to a P terminal of the power generation controller 1.

The B terminal of the vehicle generator 2 is connected to a high potential terminal of the vehicle battery 3 through a charge cable 6. The power generation controller 1 is provided with an E terminal, an F terminal, an IG terminal, and an L terminal in addition to the P terminal. The E terminal, which is connected to one end of the excitation winding 204, is grounded. The F terminal is connected to the other end of the excitation winding 204. The IG terminal is connected to the high potential terminal of the vehicle battery 3 through the ignition switch 4. The L terminal is connected to the high potential terminal of the vehicle battery 3 through the warning lamp 5.

The detailed structure and operation of the power generation controller 1 are explained below. As shown in FIG. 1, the power generation controller 1 has an excitation current drive transistor 11, a flywheel diode 12, a resistor 13, a zener diode 14, a warning lamp drive transistor 15, a contact resistance detector circuit 20, and a voltage control circuit 40.

The excitation current drive transistor 11, which is series-connected to the excitation winding 204, has a source connected to the F terminal and to the cathode of the flywheel diode 12, a drain connected to the B terminal, and a gate connected to the voltage control circuit 40. The flywheel diode 12, which is parallel-connected to the excitation winding 204, has the cathode connected to the F terminal, and an anode connected to the E terminal.

The warning lamp drive transistor 15 has a collector connected to the L terminal, a base connected to the contact resistance detector circuit 20, and an emitter grounded. The warning lamp drive transistor 15 is turned on to light the warning lamp 5 when a high-level warning lamp drive signal outputted from the contact resistance detector circuit 20 is applied to the base thereof. The zener diode 14 is grounded at the anode thereof and connected to the IG terminal at the cathode thereof through the resistor 13. When the ignition switch 4 connected between the high potential terminal of the vehicle battery 3 and the IG terminal is turned on, a certain zener voltage appears at the cathode of the zener diode 14. The series circuit of the resistor 13 and the zener diode 14 also serves as a power supply circuit of the power generation controller 1. The zener voltage appearing at the cathode of the zener diode 14 when the ignition key 4 is turned on is applied to each component of the power generation controller 1 as an operating voltage.

The contact resistance detector circuit 20, which operates to detect abnormality in a contact state between the B terminal of the vehicle generator 2 and the power generation controller 1,includes resistors 21, 22, 26, 28, 29, voltage comparators 23, 30, a diode 24, a capacitor 25, and an operational amplifier 27. The resistors 21, 22 constitute a voltage divider circuit for dividing down the voltage applied to the P terminal, and applying this divided voltage to the positive input terminal of the voltage comparator 23 whose negative input terminal is connected to the output terminal of the operational amplifier 27.

The voltage comparator 23 outputs a high level signal when the divided voltage outputted from the voltage divider circuit constituted by the resistors 21, 22 is higher than the output voltage of the operational amplifier 27. The diode 24 has an anode connected to the output terminal of the voltage comparator 23, and a cathode connected to one end of a parallel circuit of the capacitor 25 and the resistor 26, the other end of which is grounded, and to the positive input terminal (non-inverting input terminal) of the operational amplifier 27. The negative input terminal (inverting input terminal) of the operational amplifier 27 is connected to the output terminal of the operational amplifier 27, which is connected to the positive input terminal of the voltage comparator 30 and to the voltage control circuit 40.

The voltage comparator 30 has a negative input terminal connected to a voltage divider circuit constituted by the resistors 28, 29, and an output terminal connected to the base of the warning lamp drive transistor 15. The voltage divider circuit constituted by the resistors 28, 29, which is connected to the B terminal of the vehicle generator 2 at one end thereof and grounded at the other end thereof, divides down the voltage applied to the B terminal. This divided voltage is applied to the negative input terminal of the voltage comparator 30. The voltage comparator 23, diode 24, capacitor 25, resistor 26 and operational amplifier 27 constitute a peakhold circuit. A peak value of the one phase voltage appearing at the P terminal is outputted from the operational amplifier 27 as explained in detail later.

The voltage control circuit 40, which is for controlling the supply of the excitation current to the excitation winding 204 by performing on/off control over the excitation current drive transistor 11, includes resistors 41, 42, 43, 44, voltage comparators 45, 46, an inverter 47, AND circuits 48, 49, and an OR circuit 50. The resistors 41, 42 constitute a voltage divider circuit connected to the cathode of the zener diode 14 at one end thereof, and grounded at the other end thereof. When the ignition switch 4 is turned on, and accordingly a certain voltage appears at the cathode of the zener diode 14, this voltage divider circuit constituted by resistors 41, 42 generates a reference voltage $V_{ref1}$ corresponding to a target voltage. The resistors 43, 44 also constitute a voltage divider circuit connected to the B terminal of the vehicle generator 2 at one end thereof, and grounded at the other end thereof. This voltage divider circuit constituted by the resistors 43, 44 divides down the voltage appearing at the B terminal to generate a check voltage $V_{B1}$.

The voltage comparator 45 has a negative input terminal connected to the voltage divider circuit constituted by the resistors 43, 44, and a positive input terminal connected to the voltage divider circuit constituted by the resistors 41, 42. The voltage comparator 45 outputs a high level signal when the check voltage $V_{B1}$ applied to the negative input terminal thereof is lower than the reference voltage $V_{ref1}$ applied to the positive terminal thereof, and otherwise outputs a low level signal.

The voltage comparator 46 has a positive input terminal connected to the voltage divider circuit constituted by the resistors 41, 42, and a negative input terminal connected to the output terminal of the operational amplifier 27 of the contact resistance detector circuit 20. The voltage comparator 46 outputs a high level signal when the peak value of the voltage appearing at the P terminal and applied to the negative input terminal thereof is lower than the reference voltage $V_{ref1}$ applied to the positive terminal thereof, and otherwise outputs a low level signal.

The AND circuit 48 is connected to the output terminal of the voltage comparator 45 at one input terminal thereof, and connected to the output terminal of the voltage comparator 30 of the contact resistance detector circuit 20 through the inverter 47. The AND circuit 49 is connected to the output terminal of the voltage comparator 46 at one input terminal thereof, and directly connected to the output terminal of the voltage comparator 30 of the contact resistance detector circuit 20. The AND circuits 48, 49, and the inverter 47 constitute a selector which operates to select the output signal of the voltage comparator 45 as an input signal of the OR circuit 50 when the contact resistance detector circuit 20 outputs a low level signal, and to select the output signal of the voltage comparator 46 as an input signal of the OR circuit 50 when the contact resistance detector circuit 20 outputs a high level signal. The OR circuit, which is connected to the gate of the excitation current drive transistor 11 at an output terminal thereof, applies one of the output signals of voltage comparators 45, 46.

Next, the operation of the power generation controller 1 having the above described structure is explained. When the ignition switch 4 is turned on to start the vehicle engine, the series circuit of the resistor 13 and zener diode 14 is supplied with a current, and as a consequence the power generation controller 1 starts to operate. When the vehicle generator 2 starts to be driven by the vehicle engine to generate electric power, the vehicle battery 3 starts to be charged.

First, the explanation is made as to how the contact resistance between the B terminal of the vehicle generator 2 and the power generation controller 1 is detected. The voltage comparator 23 of the contact resistance detector circuit 20 outputs a high level signal when the voltage appearing at the P terminal (referred to as "P terminal voltage" hereinafter) and divided by the voltage divider circuit constituted by the resistors 21, 22 is higher than a certain voltage $V_P$. This high level signal is inputted to the parallel circuit of the capacitor 25 and resistor 26 through the diode 24 and smoothed there. The smoothed signal is inputted to the positive input terminal of the operational amplifier 27. Since the negative input terminal and the output terminal of the operational amplifier 27 are connected to each other, the operational amplifier 27 operates to set the output signal thereof at such a value that the value of the signal applied to the negative input terminal thereof becomes equal to that of the signal applied to the positive input terminal thereof. In short, the value of the output signal of the operational amplifier 27 is kept the same as the value of the smoothed voltage signal applied to the positive input terminal of the operational amplifier 27. Hence, the resistors 21, 22, diode 24, capacitor 25, resistor 26 and operational amplifier 27 serve as a peak hold circuit for holding the positive side peak value of the P terminal voltage.

In this embodiment, under normal conditions where the contact resistance between the B terminal and the power generation controller 1 is very low, the value of the output signal of the operational amplifier 27 is equal to the sum of the value of the B terminal voltage and a value of the forward voltage drop of the higher half-bridge 202B (about 0.7V to 1.0V). And the check voltage $V_{B2}$ is set at a value slightly higher (0.1 to 0.3V higher) than the value of the output voltage of the operational amplifier 27 operating under the normal condition by appropriately adjusting the resistances of the resistors 21, 22. Accordingly, during the normal condition, the output signal of the voltage comparator 30 is at low level, as a consequence of which the warning lamp drive transistor 15 is maintained at off state to keep the warning lamp 5 off. During the normal condition, the output signal of the inverter 47 of the voltage control circuit 40 is at high level.

Next, the voltage control operation of the voltage control circuit 40 under the normal condition where the contact resistance between the B terminal and the power generation controller 1 is very low is explained.

The voltage comparator 45 of the voltage control circuit 40 comparing the reference voltage $V_{ref1}$ with the check voltage $V_{B1}$ obtained by dividing down the B terminal voltage, outputs a high level signal to the AND circuit 48 when the B terminal voltage is lower than the target voltage. Under the normal condition, since the output signal of the inverter 47 is at high level, the high level signal outputted from the voltage comparator 45 is applied to the excitation current drive transistor 11 through the AND circuit 48 and the OR circuit 50. In consequence, the excitation current drive transistor 11 is turned on to supply the excitation current to the excitation winding 204. On the other hand, when the B terminal voltage is higher than the target voltage, since the voltage comparator 45 outputs a low level signal, the excitation current drive transistor 11 is turned off to interrupt the supply of the excitation current to the excitation winding 204. In this way, the voltage at the terminal B and accordingly the voltage at the high potential terminal of the vehicle battery 2 are kept at the target voltage.

Next, the voltage control operation of the voltage control circuit 40 under abnormal condition where the contact resistance between the B terminal and the power generation controller 1 is large is explained.

When the B terminal and the power generation controller 1 become in imperfect contact where the contact resistance therebetween is large, the B terminal voltage applied to the voltage divider circuit constituted by resistors 43, 44 is lowered, and the check voltage $V_{B1}$ generated by this voltage divider circuit is lowered accordingly. At this time, since the voltage control circuit 40 operates to turn on the excitation current drive transistor 11 to increase the excitation current so that the check voltage BV1 becomes equal to the reference voltage $V_{ref1}$, the B terminal voltage and the P terminal voltage increase.

For example, when the contact resistance is 0.5Ω, and the current flowing from the B terminal to the power generation controller 1 is 4A, the voltage drop due to the contact resistance becomes 2V. Incidentally, the current flowing from the B terminal to the power generation controller 1 can be regarded as the excitation current flowing into the excitation winding 204 through the excitation current drive transistor 11, because each component of the power generation controller 1 is supplied with operation current through the IG terminal. If the output signal of the operational amplifier 27 becomes higher than the check voltage $V_{B2}$ due to the large contact resistance between the B terminal and the power generation controller 1, the output signal of the voltage comparator 30 becomes high level to turn on the warning lamp drive transistor 15 to thereby light the warning lamp 5. Also, when the output signal of the voltage comparator 30 becomes high level, the AND circuit 49 is enabled, and the AND circuit 48 is disabled because the output signal of the inverter 47 becomes low level. Accordingly, the excitation current drive transistor 11 starts to be on/off controlled so at to make the peak value of the P terminal voltage outputted from the operational amplifier 27 equal to the reference voltage $V_{ref1}$.

Thus, with the power generation controller 1 having the contact resistance detector circuit 20, it becomes possible to reliably detect abnormality in the contact state between the B terminal of the vehicle generator 2 and the power generation controller 1.

As clear from the above explanation, the contact resistance detector circuit 20 determines that there occurs abnormality in the contact state between the B terminal of the vehicle generator 2 and the power generation controller 1 if the one phase voltage of the stator winding 200 (P terminal voltage) of the vehicle generator 2 is higher than the sum of the full-wave rectified output voltage of the vehicle generator 2 detected on the side of the power generation controller 1 and the forward voltage drop of the diodes of the full wave rectifier 202. Since if the one phase voltage of the stator winding 200 is detected to be higher than the full-wave rectified output voltage of the vehicle generator 2 added by the forward voltage drop of the diodes of the full wave rectifier 202, it means that the contact resistance between the B terminal and the power generation controller 1 becomes excessively large, occurrence of abnormality in the contact state between the B terminal and the power generation controller 1 can be reliably detected by comparing the one phase voltage of the stator winding 200 with the B terminal voltage.

In addition, since the warning lamp 5 is lit when the contact resistance detector circuit 20 detects abnormality in the contact state between the B terminal and the power generation controller 1, the vehicle driver can immediately know the occurrence of the abnormality in the contact state between the B terminal and the power generation controller.

Furthermore, since the voltage control circuit 40 is configured to change the object of comparison with the target voltage from the output voltage of the vehicle generator 2 to the one phase voltage of the stator winding 200, it becomes possible to avoid the vehicle battery from being overcharged due to excessive increase of the output voltage of the vehicle generator 2, to thereby protect electric devices mounted in the vehicle.

It is as a matter of course that various modifications can be made to the above described embodiment as described below.

Although the contact resistance detector circuit 20 is configured to perform comparison between the B terminal voltage and the P terminal voltage in this embodiment for detecting abnormality in the contact state, the contact resistance detector circuit 20 may be configured to use only the P terminal voltage for detecting abnormality in the contact state. That is because, when the B terminal and the power generation controller 1 become out of good contact with each other, and the output voltage of the vehicle generator 2 detected on the side of the power generation controller 1 (that is, the B terminal voltage) is lowered accordingly, the excitation current is increased to make up for the voltage lowering, as a result of which the one phase voltage of the stator winding 200 (P terminal voltage) increases. Accordingly, comparing the P terminal voltage with a predetermined value makes it possible to detect abnormality in the contact state between the B terminal and the power generation controller 1. In this case, the negative input terminal of the voltage comparator 30 is applied with a fixed voltage.

Second Embodiment

Figure 2:
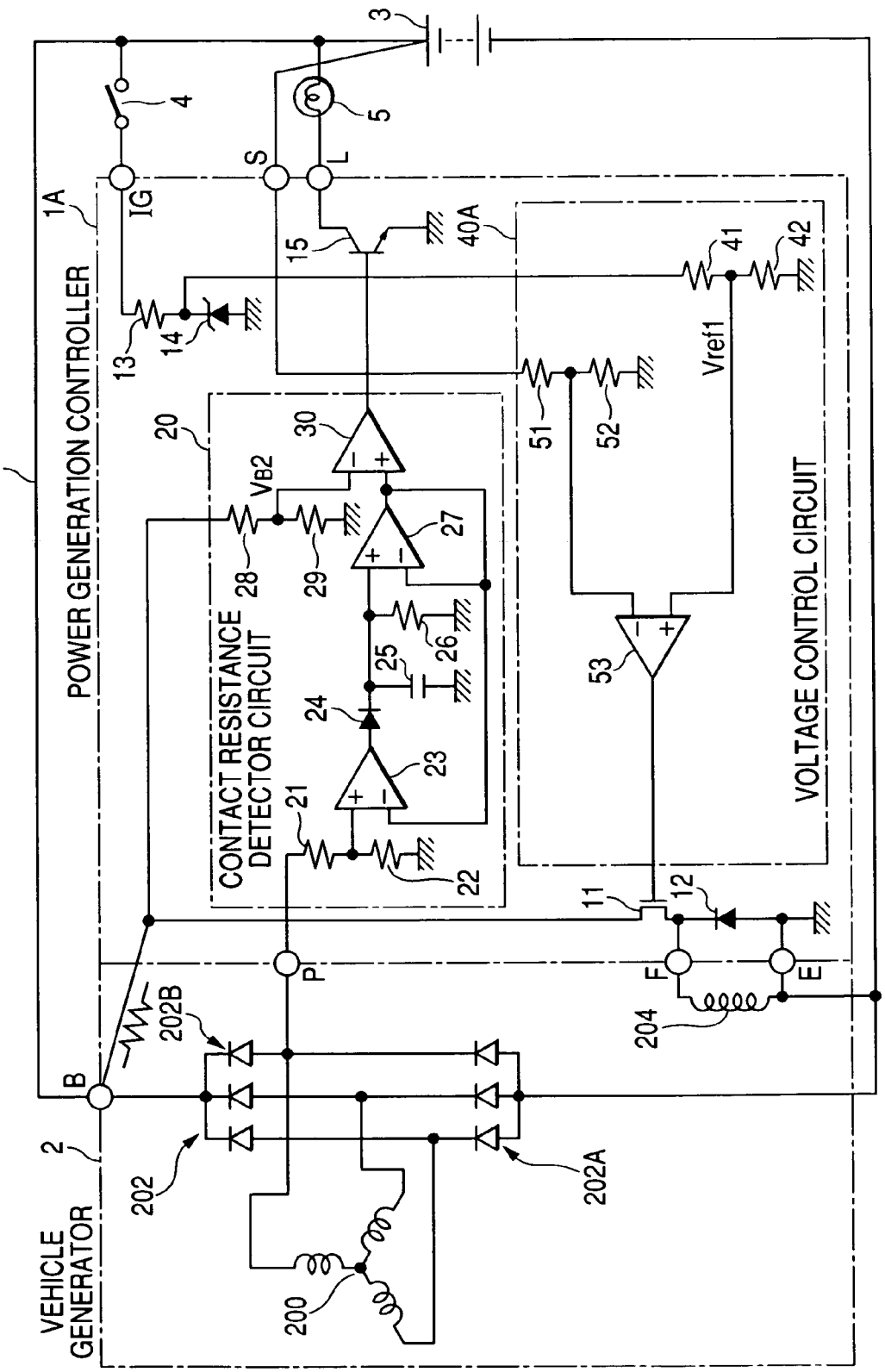
FIG. 2 is a diagram showing a structure of a power generation controller according to a second embodiment of the invention.

FIG. 2 is a diagram showing a structure of a power generation controller 1A according to a second embodiment of the invention. Although the above described power generation controller 1 of the first embodiment is configured to perform on/off control over the excitation current such that the B terminal voltage is kept at the target voltage, it may be configured to perform on/off control over the excitation current such that the battery voltage is kept at the target voltage.

As seen from FIG. 2, the structure of the power generation controller 1A of the second embodiment is different from that of the power generation controller 1 of the first embodiment in that the voltage control circuit 40 is replaced by a voltage control circuit 40A configured to perform on/off control over the excitation current such that the battery voltage is kept at the target voltage, and an S terminal is additionally provided. The voltage control circuit 40A includes a voltage comparator 53 having a positive input terminal to which the reference voltage $V_{ref1}$ generated by the voltage divider circuit constituted by the resistors 41, 42 is applied, and a negative input terminal to which the S terminal voltage (battery voltage) divided by the voltage divider circuit constituted by resistors 51, 52 is applied. The voltage comparator 53 outputs a high level signal to turn on the excitation current drive transistor 11, when the battery voltage is lower than the target voltage and accordingly the divided voltage outputted from the voltage divider circuit constituted by resistors 51, 52 is lower than the reference voltage $V_{ref1}$.

In the case where the excitation current is on/off controlled such that the battery voltage is kept at the target voltage, the battery voltage can be prevented from increasing excessively even when the contact resistance between the B terminal and the power generation controller 1 increases abnormally. However, in this case, there is a possibility that the battery is undercharged, because the excitation current flowing from the B terminal to the excitation winding 204 through the excitation current drive transistor 11 is reduced by the voltage drop due to the increased contact resistance.

In the second embodiment, since, when there occurs abnormality in the contact state between the B terminal and the power generation controller 1, the warning lamp is lit, the vehicle driver can immediately know the occurrence of the abnormality, and accordingly the vehicle driver can make a necessary check or repair without delay.

Third Embodiment

Figure 3:
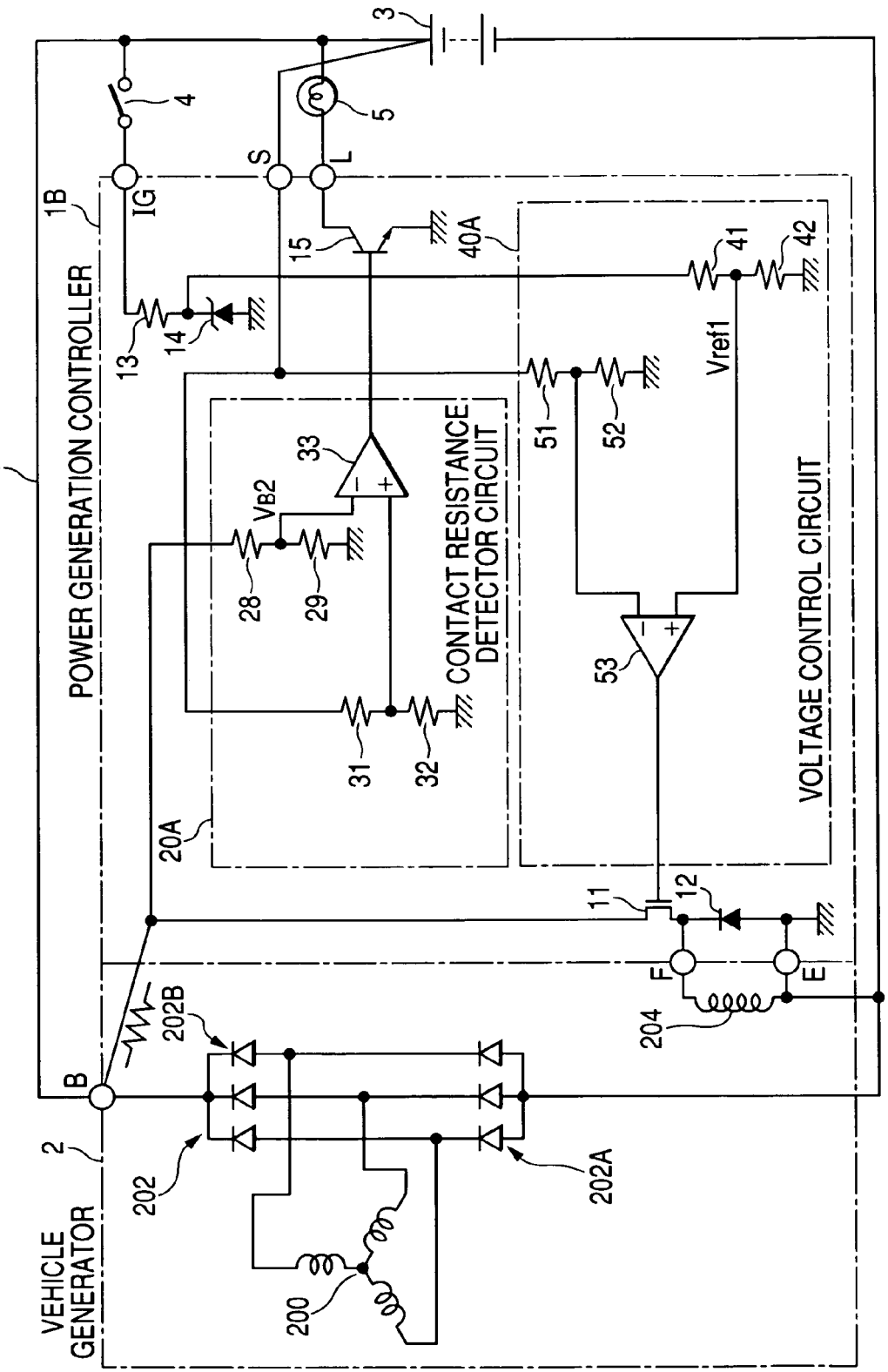
FIG. 3 is a diagram showing a structure of a power generation controller according to a third embodiment of the invention.

FIG. 3 is a diagram showing a structure of a power generation controller 1B according to a third embodiment of the invention. Although the contact resistance detector circuit 20 of the first and the second embodiments is configured to perform comparison between the B terminal voltage and the P terminal voltage, it may be configured to perform comparison between the B terminal voltage and the battery voltage to detect abnormality in the contact state between the between the B terminal and the power generation controller 1.

As seen from FIG. 3, the structure of the power generation controller 1B of the third embodiment is different from that of the power generation controller 1A of the second embodiment in that the contact resistance detector circuit 20 is replaced by a contact resistance detector circuit 20A configured to perform comparison between the B terminal voltage and the battery voltage. The contact resistance detector circuit 20A includes a voltage comparator 33 having a negative input terminal to which the check voltage $V_{B2}$ generated by the voltage divider circuit constituted by the resistors 28, 29 is applied, and a positive input terminal to which a divided voltage generated by dividing down the S terminal voltage (battery voltage) by a voltage divider circuit constituted by resistors 31, 32 is applied. When the B terminal and the power generation controller 1 become out of good contact with each other, the B terminal voltage detected on the side of the power generation controller 1B becomes lower than the battery voltage. Accordingly, performing comparison between the detected B terminal voltage and the battery voltage makes it possible to detect abnormality in the contact state between the B terminal and the power generation controller 1B.

The third embodiment can be made simpler in structure since it does not need any complicated circuitry for holding the peak value of the P terminal voltage.

The above described embodiments may be configured to inform an outer device such as an engine control unit of occurrence of abnormality in the contact state between the B terminal and the power generation controller instead of lighting the warning lamp 5.

The above explained preferred embodiments are exemplary of the invention of the present application which is described solely by the claims appended below. It should be understood that modifications of the preferred embodiments may be made as would occur to one of skill in the art.

What is claimed is:

1. A power generation controller for regulating an output voltage of a vehicle generator or a battery voltage of a vehicle battery charged by said vehicle generator by controlling an excitation current flowing into an excitation winding of said vehicle generator, said power generation controller comprising:
    a switching element connected in series between an output terminal of said vehicle generator and said excitation winding;
    a voltage control circuit on/off controlling said switching element such that one of said output voltage of said vehicle generator and said battery voltage is kept at a target voltage; and
    a contact abnormality detector circuit detecting a voltage of said output terminal as said output voltage of said vehicle generator, and detecting abnormality in a contact state between said power generation controller and said output terminal on the basis of said detected output voltage of said vehicle generator, wherein
    said contact abnormality detector circuit is configured to detect said abnormality on the basis of a contact resistance between said output terminal of said vehicle generator and said power generation controller, and
    said contact abnormality detector circuit is configured to determine that said abnormality has occurred when a one-phase voltage of a stator winding of said vehicle generator has become higher than a sum of said detected output voltage of said vehicle generator after being full-wave rectified by a full-wave rectifier constituted by diodes included in said vehicle generator, and a forward voltage drop of said diodes.

2. The power generation controller according to claim 1, further comprising a warning lamp lit when said contact abnormality detector circuit determines that said abnormality has occurred.

3. The power generation controller according to claim 1, wherein said voltage control circuit is configured to on/off control said switching element such that said detected output voltage of said vehicle generator is kept at said target voltage while said contact abnormality detector circuit does not detect said abnormality, and that said battery voltage is kept at said target voltage while said contact abnormality detector circuit detects said abnormality.

4. A power generation controller for regulating an output voltage of a vehicle generator or a battery voltage of a vehicle battery charged by said vehicle generator by controlling an excitation current flowing into an excitation winding of said vehicle generator, said power generation controller comprising:
    a switching element connected in series between an output terminal of said vehicle generator and said excitation winding;
    a voltage control circuit on/off controlling said switching element such that one of said output voltage of said vehicle generator and said battery voltage is kept at a target voltage; and
    a contact abnormality detector circuit detecting a voltage of said output terminal as said output voltage of said vehicle generator, and detecting abnormality in a contact state between said power generation controller and said output terminal on the basis of said detected output voltage of said vehicle generator, wherein
    said contact abnormality detector circuit is configured to detect said abnormality on the basis of a contact resistance between said output terminal of said vehicle generator and said power generation controller, and
    said contact abnormality detector circuit is configured to determine that said abnormality has occurred when a one-phase voltage of a stator winding of said vehicle generator has become higher than a predetermined value.

5. The power generation controller according to claim 4, further comprising a warning lamp lit when said contact abnormality detector circuit determines that said abnormality has occurred.

6. The power generation controller according to claim 4, wherein said voltage control circuit is configured to on/off control said switching element such that said detected output voltage of said vehicle generator is kept at said target voltage while said contact abnormality detector circuit does not detect said abnormality, and that said battery voltage is kept at said target voltage while said contact abnormality detector circuit detects said abnormality.

7. A power generation controller for regulating an output voltage of a vehicle generator or a battery voltage of a vehicle battery charged by said vehicle generator by controlling an excitation current flowing into an excitation winding of said vehicle generator, said power generation controller comprising:
    a switching element connected in series between an output terminal of said vehicle generator and said excitation winding;
    a voltage control circuit on/off controlling said switching element such that one of said output voltage of said vehicle generator and said battery voltage is kept at a target voltage; and
    a contact abnormality detector circuit detecting a voltage of said output terminal as said output voltage of said vehicle generator, and detecting abnormality in a contact state between said power generation controller and said output terminal on the basis of said detected output voltage of said vehicle generator, wherein
    said contact abnormality detector circuit is configured to detect said abnormality on the basis of a contact resistance between said output terminal of said vehicle generator and said power generation controller, and
    said contact abnormality detector circuit is configured to determine that said abnormality has occurred when said battery voltage has become higher than said detected output voltage of said vehicle generator.

8. The power generation controller according to claim 7, further comprising a warning lamp lit when said contact abnormality detector circuit determines that said abnormality has occurred.

* * * * *